(12) United States Patent
Sanada

(10) Patent No.: US 6,657,319 B2
(45) Date of Patent: Dec. 2, 2003

(54) ELECTRIC POWER SYSTEM INTERCONNECTION DEVICE

(75) Inventor: Kazunori Sanada, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/152,685

(22) Filed: May 23, 2002

(65) Prior Publication Data

US 2003/0090155 A1 May 15, 2003

(30) Foreign Application Priority Data

Nov. 9, 2001 (JP) .................................... 2001-344056

(51) Int. Cl.$^7$ ................................................ H02J 1/12
(52) U.S. Cl. ............................. 307/45; 307/85; 361/2
(58) Field of Search ............................ 307/43–45, 51, 307/52, 64, 85; 361/2

(56) References Cited

U.S. PATENT DOCUMENTS 4,280,160 A * 7/1981 Mori .............................. 361/3
6,049,143 A * 4/2000 Simpson et al. ............ 307/126
6,184,593 B1 * 2/2001 Jungreis ....................... 307/64

FOREIGN PATENT DOCUMENTS

JP 62-254632 11/1987

* cited by examiner

Primary Examiner—Gregory J. Toatley, Jr.
Assistant Examiner—Sharon A. Polk
(74) Attorney, Agent, or Firm—Leydig, Voit & Mayer, Ltd.

(57) ABSTRACT

In an electric power system interconnection device, a primary power supply is connected to a load via a switch and a secondary power supply is connected to a load side of the load via a power converter to establish coordinated interconnection of the primary power supply and the secondary power supply. When the switch is opened in the event of a failure of the primary power supply, the electric power system interconnection device extinguishes an arc current flowing through the switch, at a high speed, by controlling an output current of the power converter using the load current flowing into the load as an output current command for the power converter so that uninterrupted electric power is supplied to the load.

8 Claims, 11 Drawing Sheets

ELECTRIC POWER SYSTEM INTERCONNECTION DEVICE

BACKGROUND OF THE INVENTION

1. Field of the Invention

The present invention relates to an electric power system interconnection device for providing uninterrupted electric power to a load in a stable fashion even in the event of a failure of a primary power supply by establishing coordinated interconnection of the primary power supply and a secondary power supply via a power converter.

2. Description of the Background Art

FIG. 13 is a block diagram of an uninterruptible power supply unit, a conventionally known example of an electric power system interconnection device, disclosed in Japanese Examined Patent Publication No. 5-76256. In this Figure, designated by the numeral 1 is an alternating current (AC) power supply, designated by the numeral 2 is a mechanical switch which connects or disconnects the AC power supply 1 to or from a load 3, designated by the numeral 4 is a power converter which is connected to a line connecting the switch 2 and the load 3 and converts direct current (DC) to AC, and AC to DC, designated by the numeral 5 is a storage battery, designated by the numeral 6 is a charging control circuit which controls charging of the battery 5 (or the DC power supply) from the AC power supply 1 when it is under normal operating conditions, designated by the numeral 7 is a constant voltage control circuit which controls the power converter 4 such that it outputs a specified constant voltage, designated by the numeral 8 is a selector which selects an output signal of the charging control circuit 6 or an output signal of the constant voltage control circuit 7, designated by the numeral 9 is a pulse-width-modulation (PWM) gate drive circuit which generates an operation command to be given to the power converter 4 based on the output signal of either the charging control circuit 6 or the constant voltage control circuit 7 selected by the selector 8, and designated by the numeral 10 is an interrupt control circuit which outputs an interrupt signal to open the switch 2 upon detecting an abnormal condition of the AC power supply 1.

Operation of the uninterruptible power supply unit is now described below.

When the AC power supply 1 is under normal operating conditions, the switch 2 is closed allowing the AC power supply 1 to deliver electric power to the load 3. Under these conditions, the selector 8 selects the output signal of the charging control circuit 6 so that the power converter 4 is controlled by the output signal of the charging control circuit 6 via the PWM gate drive circuit 9 and charges the battery 5.

When an abnormal condition occurs in the AC power supply 1, the interrupt control circuit 10 opens the switch 2, and the selector 8 selects the output signal of the constant voltage control circuit 7 upon receiving an interrupt signal produced by the interrupt control circuit 10, whereby the constant voltage control circuit 7 controls the power converter 4 via the PWM gate drive circuit 9 such that the power converter 4 outputs a constant voltage. It is therefore possible to convert electric energy fed from the battery 5 into stable AC power by the power converter 4 and deliver it to the load 3 even in the event of a failure of the AC power supply 1.

When the conventional electric power system interconnection device thus constructed detects an abnormal condition of the AC power supply 1, the switch 2 is opened and at the same time the power converter 4 is switched to output the constant voltage, whereby the electric energy of the battery 5 is converted and supplied to the load 3. The switch 2 used in this kind of electric power system interconnection device is a mechanical switch which generally offers such advantages that it is available at low cost, the amount of heat generation is small and it has high switching surge and overcurrent withstand capabilities. High-speed mechanical switches developed in recent years operate at a speed of about 1 millisecond. However, although the mechanical switch 2 of this kind is opened with a mechanical action of such a high speed, the switch 2 is actually opened electrically only when an arc current flowing through the switch 2 becomes zero. In a case where the AC power supply 1 is commercial AC power supply, this delay time, from an off command (interrupt signal) to electrical isolation of the AC power supply 1, could reach about 10 milliseconds at worst which is 0.5 cycle of the AC power supply waveform (in the case of 60 Hz power frequency) even if the switch 2 operates at an ideally high speed. Even when the switch 2 is a non-mechanical semiconductor switch like a thyristor which does not have a self-turn-off capability, the switch 2 is not electrically opened until the current becomes zero.

For reasons stated above, even when the constant voltage control circuit 7 begins to control the power converter 4 to have it output a constant voltage following the off command for opening the switch 2, the power converter 4 remains connected to the AC power supply 1, in which an abnormal condition has occurred, until the switch 2 is completely opened electrically. Therefore, the power converter 4 can not output the constant voltage in a fully reliable fashion. This produces such a problem that the power converter 4 can not output a correct voltage to the load 3 when a short circuit has occurred in the AC power supply 1, for instance, causing the load 3 to become inoperable and abnormally stop.

SUMMARY OF THE INVENTION

Accordingly, the present invention is intended to provide a solution to the aforementioned problems of the prior art. Specifically, it is an object of the invention to provide an electric power system interconnection device which can quickly suppress an arc current flowing across contacts of a mechanical switch when the switch connecting a primary power supply and a load is opened, making it possible to electrically isolate the load from the primary power supply at a high speed in the event of a failure of the primary power supply and then supply stable electric power to the load.

In a first principal form of the invention, an electric power system interconnection device for providing uninterrupted electric power to a load by establishing coordinated interconnection of a primary power supply and a secondary power supply, in which the primary power supply is connected to the load via a switch and the secondary power supply is connected to a load side of the switch via a power converter includes an interrupt control circuit, an interrupt control circuit, a switch current interrupter for accelerating interruption of a current flowing through the switch, and a constant voltage controller for maintaining a constant voltage to be applied to the load. The interrupt control circuit outputs an interrupt control signal for opening the switch upon detecting an abnormal voltage fed from the primary power supply. The switch current interrupter for accelerating interruption of a current flowing through the switch accelerates interruption of the current flowing through the switch by controlling an output current of the power converter by a specific output current command using the interrupt control signal as an input. The constant voltage controller for maintaining a constant voltage to be applied to the load maintains the voltage applied to the load at a fixed level by controlling the power converter to output a specific constant voltage upon detecting the interruption of the current flowing through the switch.

The electric power system interconnection device of this form can quickly suppress an arc current flowing through the switch when the switch is opened so that the primary power supply is electrically disconnected from the load at a high speed in the event of a failure of the primary power supply and the electric power system interconnection device can supply stable electric power to the load.

In a second principal form of the invention, an electric power system interconnection device for providing uninterrupted electric power to a load by establishing coordinated interconnection of a primary power supply and a secondary power supply, in which the primary power supply is connected to the load via a switch and the secondary power supply is connected to a load side of the switch via a power converter includes an interrupt control circuit which outputs an interrupt control signal for opening the switch upon detecting an abnormal voltage fed from the primary power supply. This electric power system interconnection device controllably operates the power converter such that its output voltage becomes a specific constant voltage by producing an output current command based on the interrupt control signal, causing the power converter to feed a current flowing in a reverse direction to the switch to instantly interrupt a current flowing through the switch. The voltage applied to the load is then maintained at a fixed level.

The electric power system interconnection device of this form can quickly suppress an arc current flowing through the switch when the switch is opened so that the primary power supply is electrically disconnected from the load at a high speed in the event of a failure of the primary power supply and the electric power system interconnection device can supply stable electric power to the load with a simple and low-cost circuit configuration.

These and other objects, features and advantages of the invention will become more apparent from the following detailed description and the accompanying drawings.

DESCRIPTION OF THE PREFERRED EMBODIMENTS

First Embodiment

Figure 1:
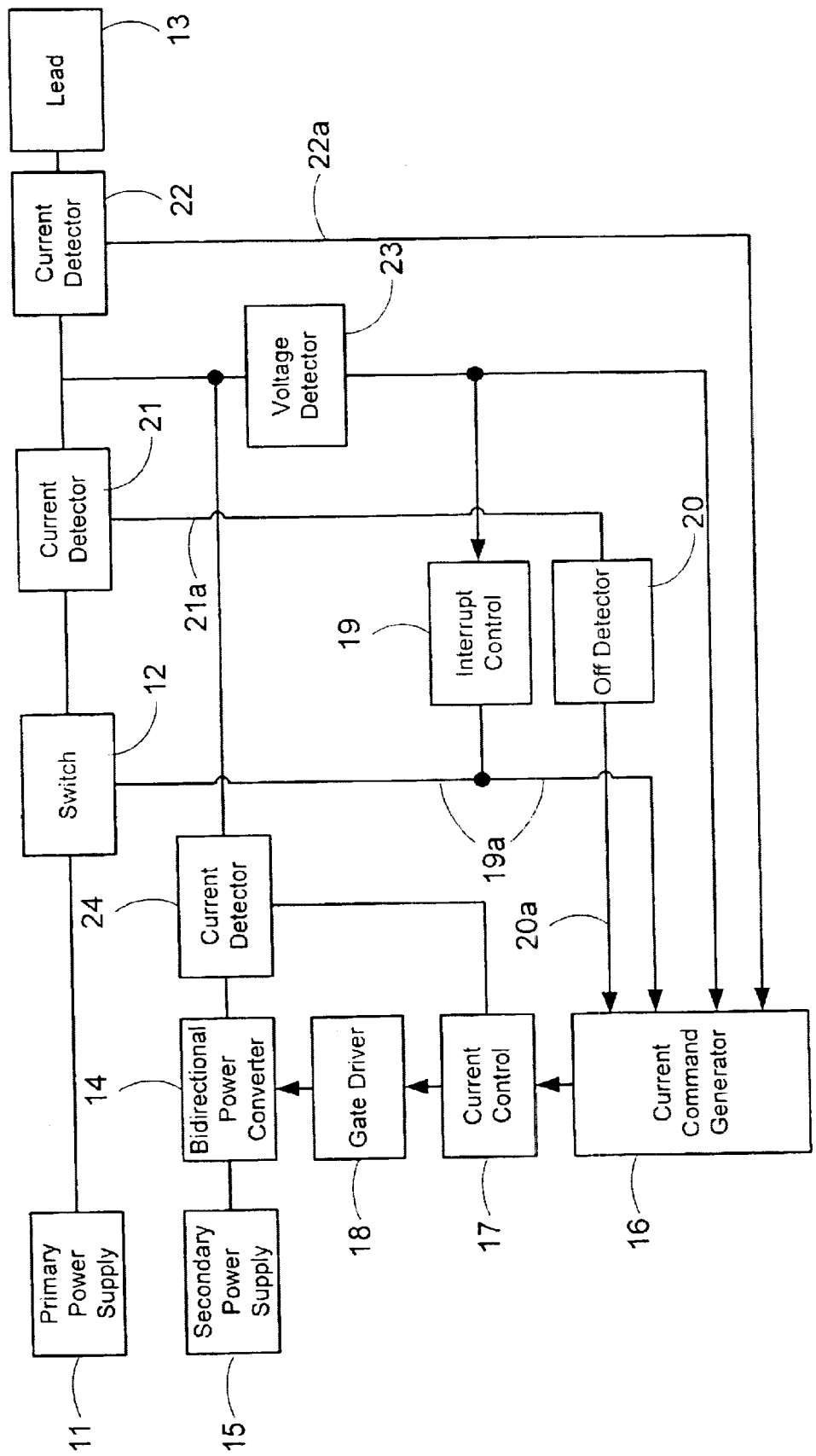
FIG. 1 is a block diagram of an electric power system interconnection device according to a first embodiment of the invention.
Figure 2:
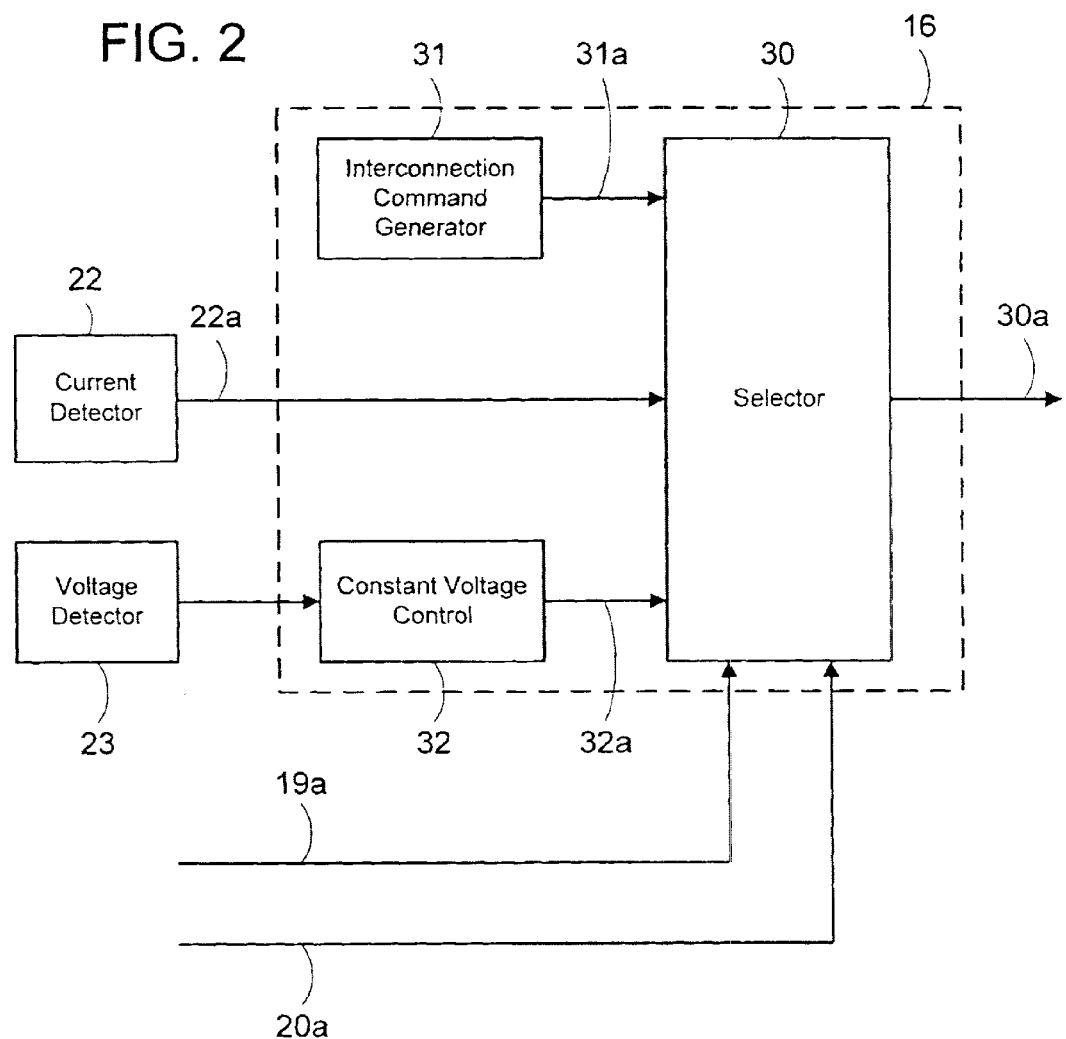
FIG. 2 is a detailed block diagram of a current command generator of the electric power system interconnection device of the first embodiment.
Figure 3:
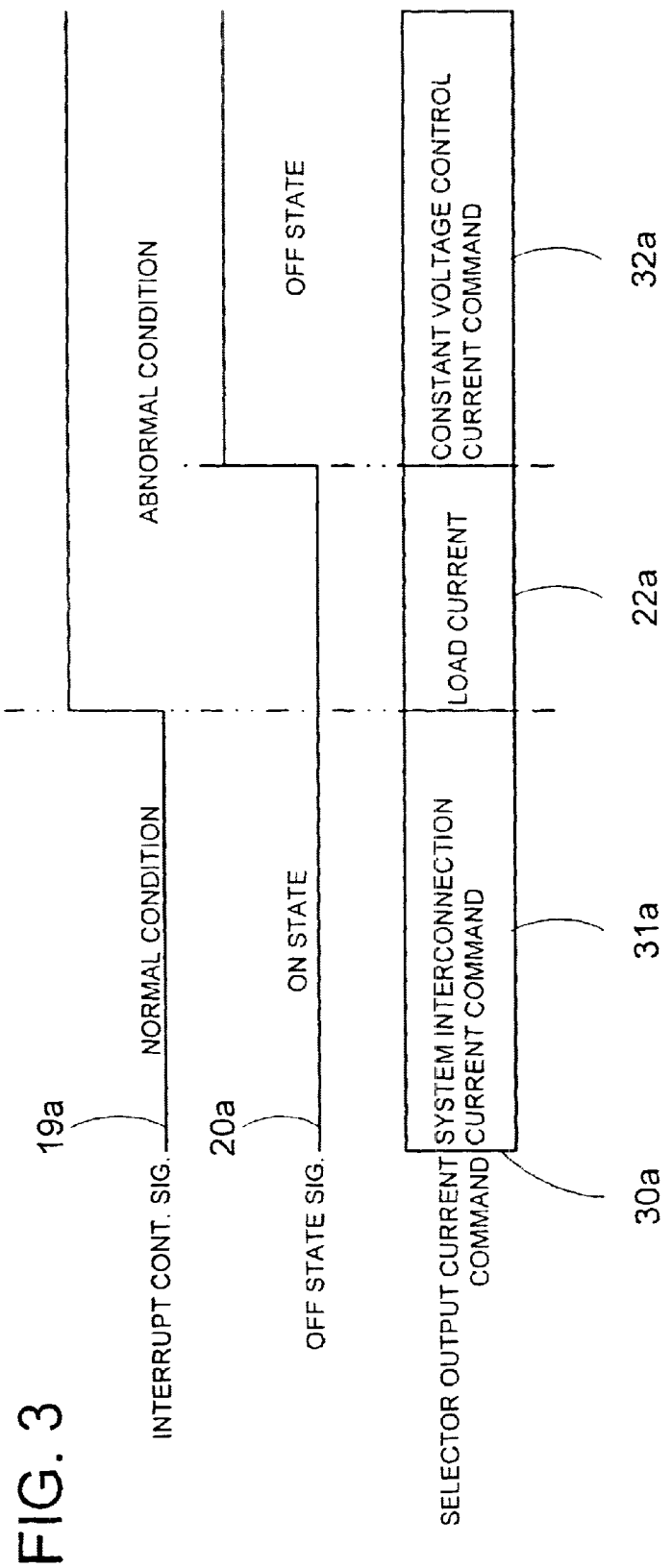
FIG. 3 is a time chart showing the operation of the electric power system interconnection device of the first embodiment.

Now, a first embodiment of the invention is described referring to FIGS. 1–3, of which FIG. 1 is a block diagram of an electric power system interconnection device according to the first embodiment.

In this Figure, designated by the numeral 11 is a primary power supply 11, designated by the numeral 12 is a high-speed mechanical switch which connects or disconnects the primary power supply 11 to or from a load 13, designated by the numeral 14 is a bidirectional power converter connected to a line between the switch 12 and the load 13, designated by the numeral 15 is a secondary power supply, designated by the numeral 16 is a current command generator which generates an output current command for the power converter 14, designated by the numeral 17 is a current control circuit which controls the power converter 14 such that its output current conforms to the output current command, designated by the numeral 18 is a gate drive circuit which generates an operation command to be given to the power converter 14, designated by the numeral 19 is an interrupt control circuit which outputs an interrupt control signal 19a for opening the switch 12 upon detecting an abnormal voltage on a load side of the switch 12, and designated by the numeral 20 is an off state detection circuit which outputs an off state signal 20a upon detecting that a current flowing through the switch 12 (hereinafter referred to as the switch current) has become zero. Further, designated by the numeral 21 is a current detector which measures the switch current flowing through the switch 12 on its load side and outputs a detected switch current value 21a to the off state detection circuit 20, designated by the numeral 22 is a current detector which measures a current flowing into the load 13 (hereinafter referred to as the load current) and outputs a detected load current value 22a to the current command generator 16, designated by the numeral 23 is a voltage detector which measures a voltage on the load side of the switch 12 and outputs a detected voltage value to the interrupt control circuit 19 and to the current command generator 16, and designated by the numeral 24 is a current detector which measures the output current of the power converter 14 and outputs a detected current value to the current control circuit 17. In this embodiment, the primary power supply 11 and the secondary power supply 15 may either be a DC or AC source.

FIG. 2 is a detailed block diagram of the current command generator 16. In this Figure, designated by the numeral 30 is a selector which outputs one output current command 30a selected from later-mentioned three types of output current commands depending on the interrupt control signal 19a and the off state signal 20a entered, designated by the numeral 31 is a system interconnection command generator which generates a system interconnection current command 31a for establishing electric power system interconnection when the primary power supply 11 is under normal operating conditions, and designated by the numeral 32 is a constant voltage control circuit which outputs a constant voltage control current command 32a obtained by using a measured output voltage of the power converter 14 as an input such that the power converter 14 outputs a specified constant voltage, wherein the three types of output current commands, that is, the system interconnection current command 31a, the constant voltage control current command 32a and the load current value 22a, are entered to the selector 30.

Operation of the electric power system interconnection device is now described.

FIG. 3 is a time chart showing the operation of the selector 30 of FIG. 2.

While the primary power supply 11 is under normal operating conditions, the switch 12 is closed and draws a current from the primary power supply 11 and the selector 30 of the current command generator 16 selects the system interconnection current command 31a as the output current command 30a as shown in FIG. 3. In this case, the secondary power supply 15 is connected to the primary power supply 11 via the power converter 14 which is operated by electric power fed from the primary power supply 11.

When an abnormal condition occurs in the primary power supply 11, the interrupt control circuit 19 detects and latches an abnormal state based on the voltage detected by the voltage detector 23 and outputs the interrupt control signal 19a. In this case, the switch 12 opens upon receiving the interrupt control signal 19a, and the selector 30 of the current command generator 16 selects the load current value 22a as the output current command 30a. As a result, the power converter 14 is controlled such that its output current matches the detected load current value 22a, and an arc current which flows through the switch 12 after mechanical parting of its contacts quickly becomes zero, whereby interruption of the switch current is completed.

When the switch current is interrupted, the off state detection circuit 20 detects this and outputs the off state signal 20a. Then, upon receiving the off state signal 20a, the selector 30 of the current command generator 16 selects the constant voltage control current command 32a as the output current command 30a. Consequently, the power converter 14 is controlled to output the constant voltage and supply stable electric power to the load 13.

In this embodiment, the switch 12 is opened and the output current of the power converter 14 is controlled using the load current value 22a as the output current command 30a to accelerate interruption of the switch current when an abnormal condition has occurred in the primary power supply 11, and then the power converter 14 is switched to output the constant voltage upon detection of the interruption of the switch current. Thus, in the event of a failure of the primary power supply 11 the switch current can be quickly interrupted upon opening the switch 12, or the primary power supply 11 under abnormal conditions can be electrically isolated from the load 13 at a high speed, and then it is possible to cause the power converter 14 to output the specified constant voltage at a high speed and thereby supply stable electric power to the load 13.

According to the invention, the switch 12 is not limited to a mechanical switch but may be a semiconductor switch like a thyristor.

Second Embodiment

Figure 4:
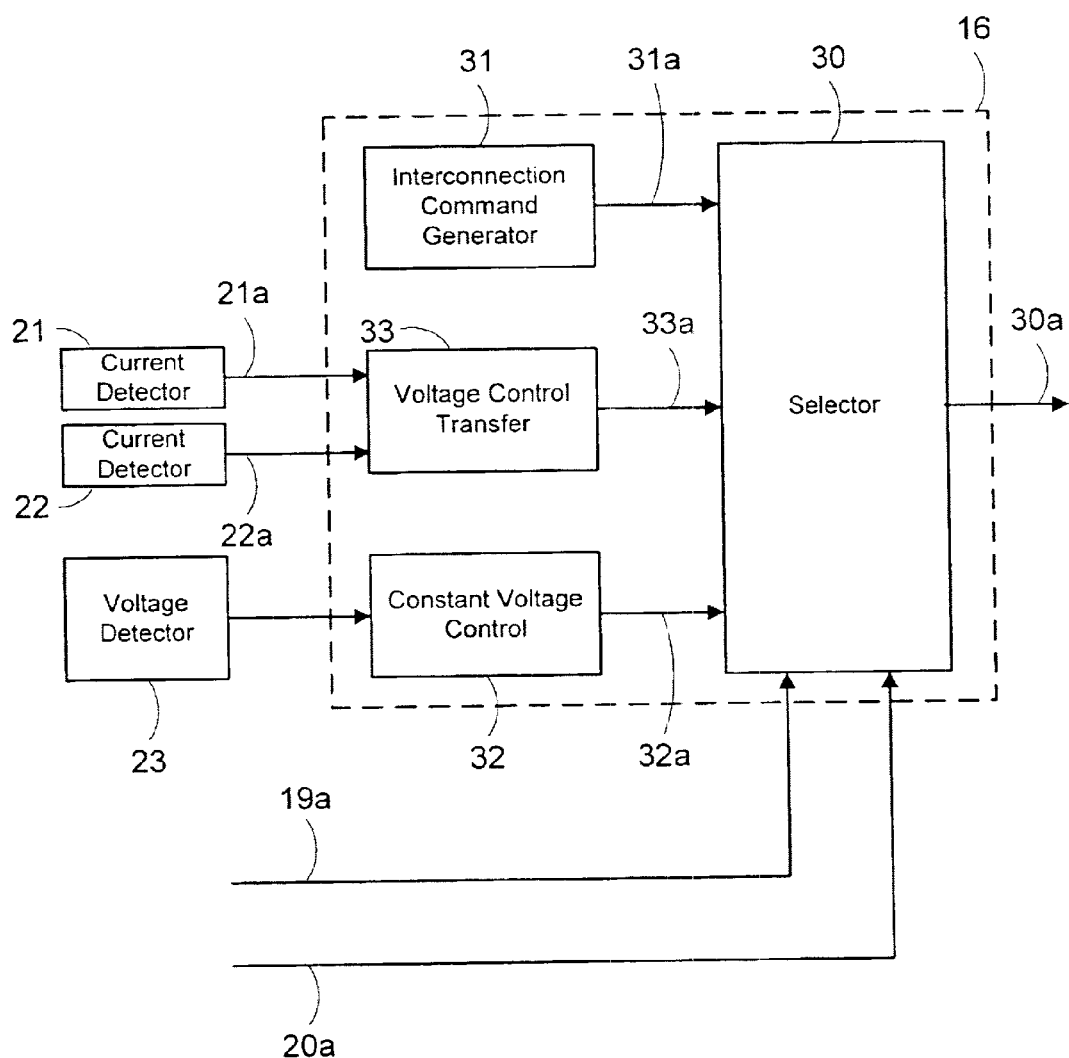
FIG. 4 is a detailed block diagram of a current command generator of an electric power system interconnection device according to a second embodiment of the invention.
Figure 5:
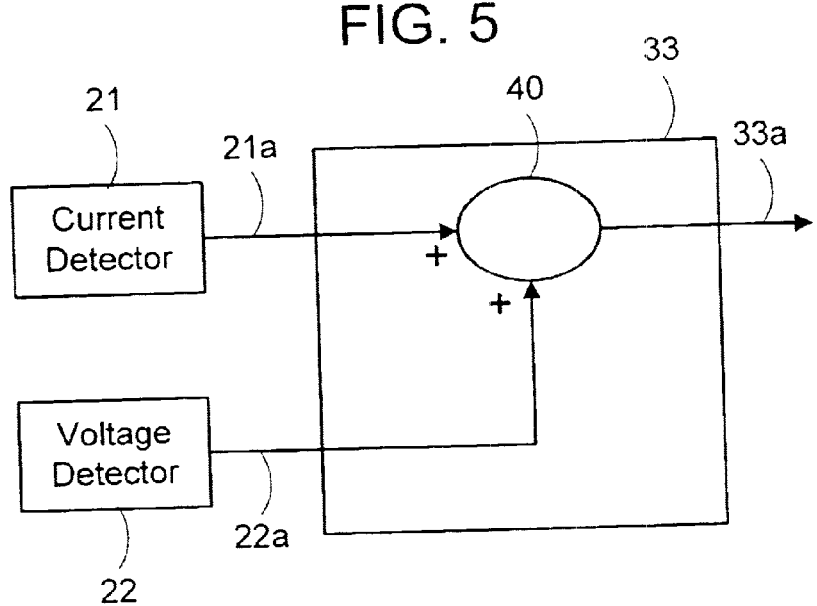
FIG. 5 is a circuit diagram showing details of a voltage control transfer circuit of the second embodiment.

Next, a second embodiment of the invention is described referring to FIGS. 4 and 5, of which FIG. 4 is a detailed block diagram of a current command generator 16 of an electric power system interconnection device according to the second embodiment. Referring to FIG. 4, designated by the numeral 33 is a voltage control transfer circuit which causes the switch current to become zero and the power converter 14 to output a specified constant voltage. The voltage control transfer circuit 33 outputs an output current command 33a obtained by using the switch current value 21a and the load current value 22a as inputs. FIG. 5 shows details of the voltage control transfer circuit 33, in which designated by the numeral 40 is an adder which adds together the switch current value 21a and the load current value 22a.

As shown in FIG. 4, the interrupt control signal 19a, the off state signal 20a, the detected load current value 22a, the detected switch current value 21a and a measured output voltage of the power converter 14 are entered to the current command generator 16. The selector 30 outputs one output current command 30a selected from three types of output current commands, that is, the system interconnection current command 31a generated when the primary power supply 11 is under normal operating conditions, the output current command 33a obtained by adding the load current value 22a and the switch current value 21a, and the constant voltage control current command 32a fed from the constant voltage control circuit 32, depending on the interrupt control signal 19a and the off state signal 20a entered.

Operation of the electric power system interconnection device of this embodiment is basically the same as that of the first embodiment. The second embodiment is characterized in that on the occurrence of an abnormal condition of the primary power supply 11 the switch 12 is opened by the interrupt control signal 19a fed from the interrupt control circuit 19, and the selector 30 of the current command generator 16 conditionally selects the output current command 33a which is an output of the voltage control transfer circuit 33 obtained by adding the load current value 22a and the switch current value 21a.

As previously discussed with reference to the first embodiment, the switch current becomes zero if the output current of the power converter 14 is made equal to the load current value 22a. Even if the output current of the power converter 14 apparently equals the load current value 22a, however, a small amount of current may still be flowing through the switch 12 due to errors of the control circuits or of the detectors. The second embodiment makes it possible to interrupt the switch current with greater accuracy even in the presence of such system errors because the switch current is detected and made equal to zero using the output current command 33a obtained by adding the switch current value 21a to the load current value 22a.

Therefore, in the event of a failure of the primary power supply 11 the switch current can be quickly and accurately interrupted upon opening the switch 12, or the primary power supply 11 under abnormal conditions can be electrically isolated from the load 13 at a high speed with a high degree of accuracy, and then it is possible to cause the power converter 14 to output the specified constant voltage at a high speed and thereby supply stable electric power to the load 13 in a reliable fashion.

Third Embodiment

Figure 6:
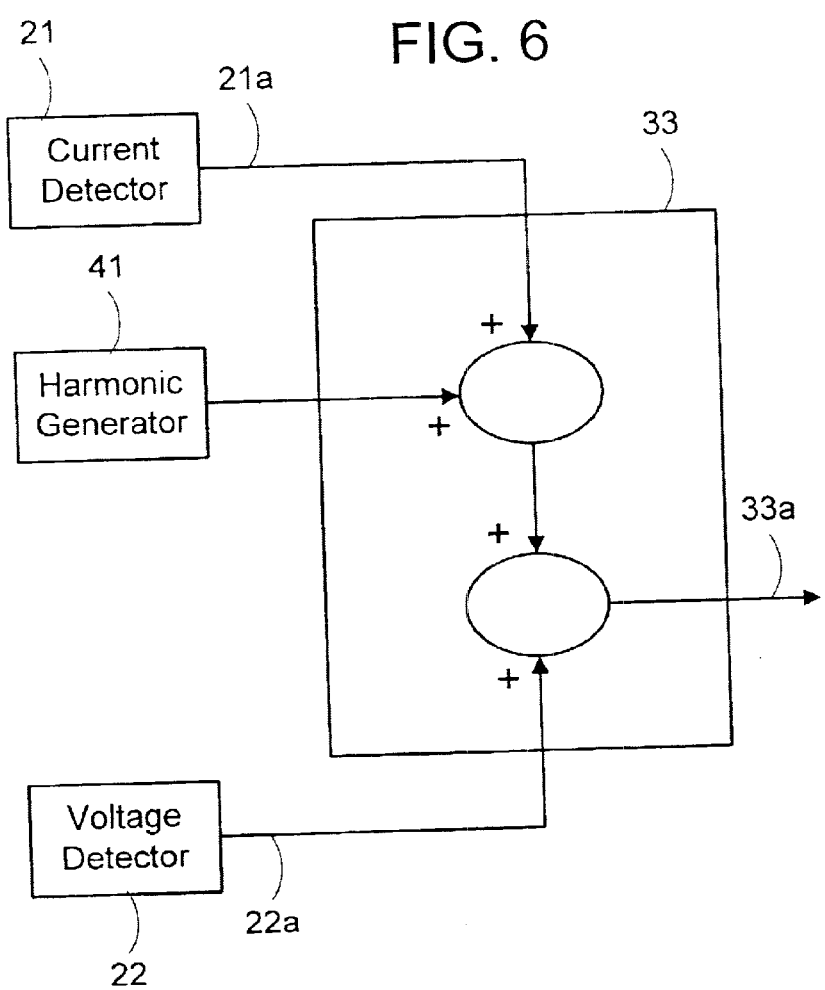
FIG. 6 is a circuit diagram showing details of a voltage control transfer circuit of an electric power system interconnection device according to a third embodiment of the invention.

In contrast to the second embodiment, in which the voltage control transfer circuit 33 for causing the switch current to become zero and the power converter 14 to output a specified constant voltage outputs the output current command 33a obtained by adding the switch current value 21a to the load current value 22a, a third embodiment of the invention described below employs a voltage control transfer circuit 33 configured as shown in FIG. 6. The voltage control transfer circuit 33 of the third embodiment includes a harmonic AC current generator 41 and adders 42, 43 as illustrated. The voltage control transfer circuit 33 adds the switch current value 21a and harmonic AC current command output from the harmonic AC current generator 41 to the load current value 22a and outputs the sum of these three parameters as an output current command 33a.

As the harmonic AC current command is added as an element of the output current command 33a, a harmonic AC current is superimposed on the output current of the power converter 14 and at least part of the harmonic AC current flows through the switch 12. During one period of this harmonic AC current there exists at least one point where the switch current becomes zero. The arc current (switch current) is interrupted at that point.

It is possible to interrupt the switch current more quickly if the harmonic AC current command added as one element of the output current command 33a is so determined as to increase the frequency of the harmonic AC current. Also, if the amplitude of the harmonic AC current is determined taking into account error components related to output current control, the switch current can be interrupted more positively.

While the harmonic AC current command is added as an element of the output current command 33a for the power converter 14 in the present embodiment, the same effect of accelerating interruption of the switch current is obtained by adding a specific AC current command if the primary power supply 11 is a DC power supply. In a case where the primary power supply 11 is an AC power supply, it is possible to accelerate interruption of the switch current by adding an AC current command which produces an AC current whose frequency is higher than that of the switch current.

Furthermore, although the switch current value 21a and the harmonic AC current command are added to the load current value 22a in this embodiment, it may be modified to obtain the output current command 33a by adding the harmonic AC current command to the load current value 22a.

Fourth Embodiment

Figure 7:
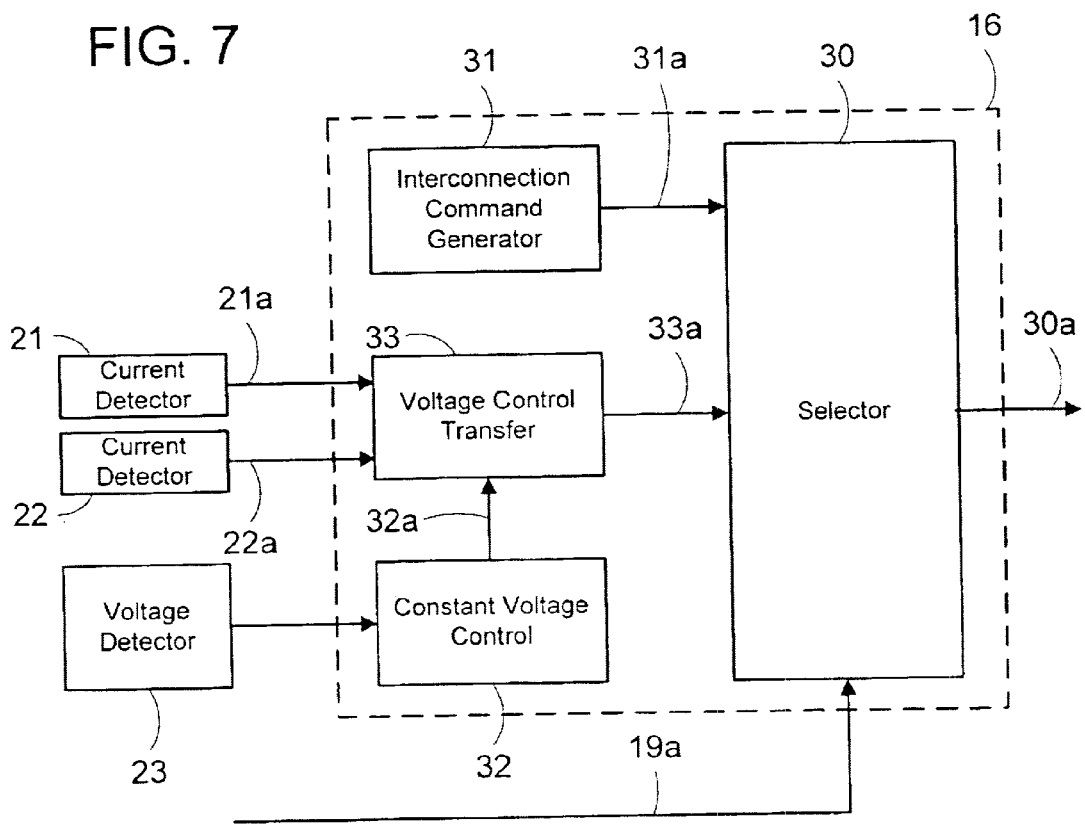
FIG. 7 is a detailed block diagram of a current command generator of an electric power system interconnection device according to a fourth embodiment of the invention.
Figure 8:
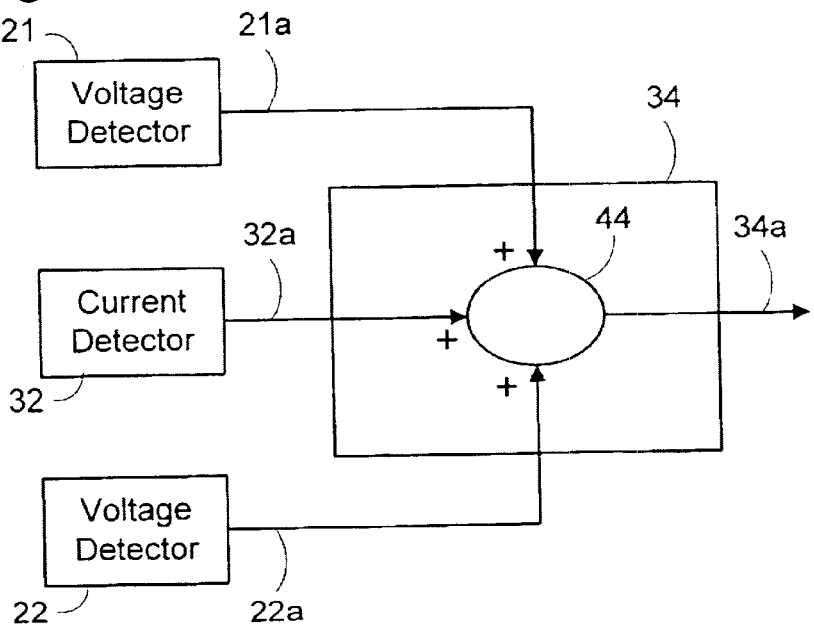
FIG. 8 is a circuit diagram showing details of a constant voltage control command generator of the fourth embodiment.
Figure 9:
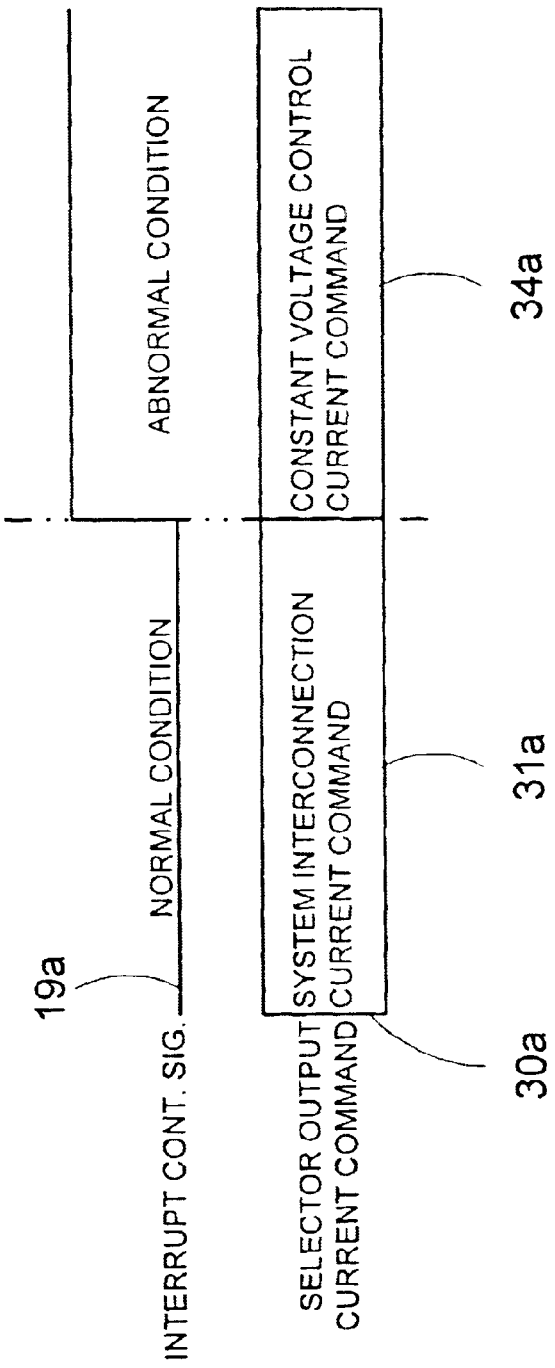
FIG. 9 is a time chart showing the operation of the electric power system interconnection device of the fourth embodiment.

A fourth embodiment of the invention is now described referring to FIGS. 7–9, of which FIG. 7 is a detailed block diagram of a current command generator 16 according to the fourth embodiment. Referring to FIG. 7, designated by the numeral 34 is a constant voltage control command generator which causes the switch current to become zero and the power converter 14 to output a specified constant voltage in the event of a failure of the primary power supply 11. The constant voltage control command generator 34 outputs a constant voltage control current command 34a obtained by using the switch current value 21a, the load current value 22a and the current command 32a fed from the constant voltage control circuit 32 as inputs. FIG. 8 shows details of the constant voltage control command generator 34, in which designated by the numeral 44 is an adder which adds together the load current value 22a, the switch current value 21a and the current command 32a fed from the constant voltage control circuit 32 and outputs the sum of these three parameters as the constant voltage control current command 34a.

As shown in FIG. 7, the detected load current value 22a, the switch current value 21a, the output voltage of the power converter 14 and the interrupt control signal 19a are entered to the current command generator 16. The selector 30 outputs one output current command 30a selected from two types of output current commands, that is, the system interconnection current command 31a generated when the primary power supply 11 is under normal operating conditions and the constant voltage control current command 34a generated when the primary power supply 11 is under abnormal operating conditions, depending on the interrupt control signal 19a entered.

FIG. 9 is a time chart showing the operation of the selector 30 of FIG. 7.

While the primary power supply 11 is under normal operating conditions, the switch 12 is closed and draws a current from the primary power supply 11 and the selector 30 of the current command generator 16 selects the system interconnection current command 31a as the output current command 30a as shown in FIG. 9. In this case, the secondary power supply 15 is connected to the primary power supply 11 via the power converter 14 which is operated by electric power fed from the primary power supply 11.

When an abnormal condition occurs in the primary power supply 11, the interrupt control circuit 19 detects and latches an abnormal state based on the voltage detected by the voltage detector 23 and outputs the interrupt control signal 19a. In this case, the switch 12 opens upon receiving the interrupt control signal 19a, and the selector 30 of the current command generator 16 selects the constant voltage control current command 34a as the output current command 30a. As a result, the power converter 14 is controlled to output the constant voltage. If the switch current flowing from the primary power supply 11 into the load 13 is still uninterrupted at this point in time, part of the current output from the power converter 14 flows back into the primary power supply 11 which is presently under abnormal conditions, or a certain amount of current is caused to flow into the switch 12 in a direction opposite to the normal switch current, so that the switch current is instantly interrupted. When the switch current is interrupted, the constant voltage control circuit 32 is electrically isolated from the primary power supply 11 under abnormal conditions and the constant voltage control circuit 32 operates normally. Then, the power converter 14 can be automatically set to output the specified constant voltage to the power converter 14. Thus, it is not necessary to detect an off state of the switch current and, as a consequence, the current detector 21 for measuring the switch current and the off state detection circuit 20 become unnecessary. This embodiment makes it possible to interrupt the switch current at a high speed and cause the power converter 14 to output the specified constant voltage with an inexpensive, simple circuit configuration.

In this embodiment, the constant voltage control command generator 34 generates the constant voltage control current command 34a which serves as the output current command by adding the load current value 22a and the switch current value 21a to the constant voltage control current command 32a which is calculated by the constant voltage control circuit 32 from the deviation of the measured output voltage of the power converter 14 from a voltage command given to it in such a way that the output voltage of the power converter 14 matches the specified constant voltage. Japanese Examined Patent Publication No. 7-44841 discloses a similar approach in which measured load current is added as one element of an output current command for constant voltage control. This prior-art approach makes it unnecessary to compensate for the load current which is one of disturbing factors in voltage control by constant voltage control operation and helps improve the accuracy of control and response characteristics. In this embodiment, the output current command is generated by adding not only the load current value 22a but also the switch current value 21a in the present embodiment so that the accuracy of control is further improved.

Fifth Embodiment

Next, an electric power system interconnection device according to a fifth embodiment of the invention is described. Compared to the first embodiment, the electric power system interconnection device of this embodiment is characterized in that it has an additional function which enables a primary power supply 11 to quickly resupply electric power to a load 13 when the primary power supply 11 which has been under abnormal conditions restores its normal operating conditions.

Figure 10:
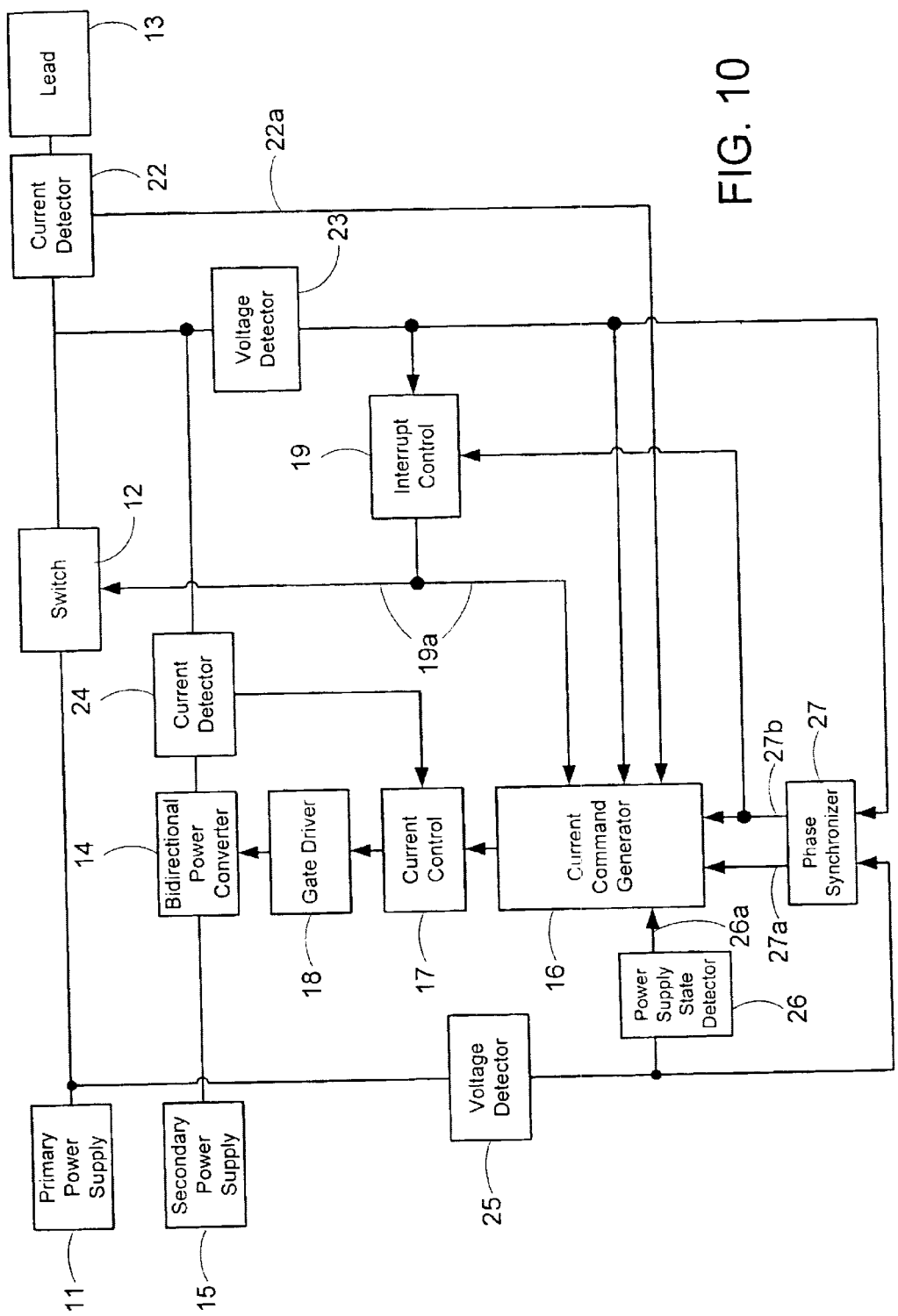
FIG. 10 is a block diagram of an electric power system interconnection device of a fifth embodiment of the invention.

FIG. 10 is a block diagram of the electric power system interconnection device of the fifth embodiment. Referring to FIG. 10, designated by the numeral 25 is a voltage detector for detecting voltage supplied from the primary power supply 11, and designated by the numeral 26 is a power supply state detection circuit for detecting whether the power supply is under normal operating conditions based on the detected voltage of the primary power supply 11. When the voltage of the primary power supply 11 is judged to be normal, the power supply state detection circuit 26 outputs a power supply normal signal 26a. Designated by the numeral 27 is a phase synchronizing circuit for synchronizing the phase of the voltage of the primary power supply 11 to that of a voltage applied to the load 13 (hereinafter referred to as the load voltage). The phase synchronizing circuit 27 outputs phase control amount 27a to a current command generator 16 for synchronizing the phase of output voltage of a power converter 14 with the phase of the voltage of the primary power supply 11. Also, the phase synchronizing circuit 27 detects a state of phase synchronization and outputs a phase matching signal 27b upon detecting the state of phase synchronization. An interrupt control circuit 19 not only opens a switch 12 by outputting an interrupt control signal 19a but also closes again the switch 12 by canceling the interrupt control signal 19a.

Figure 11:
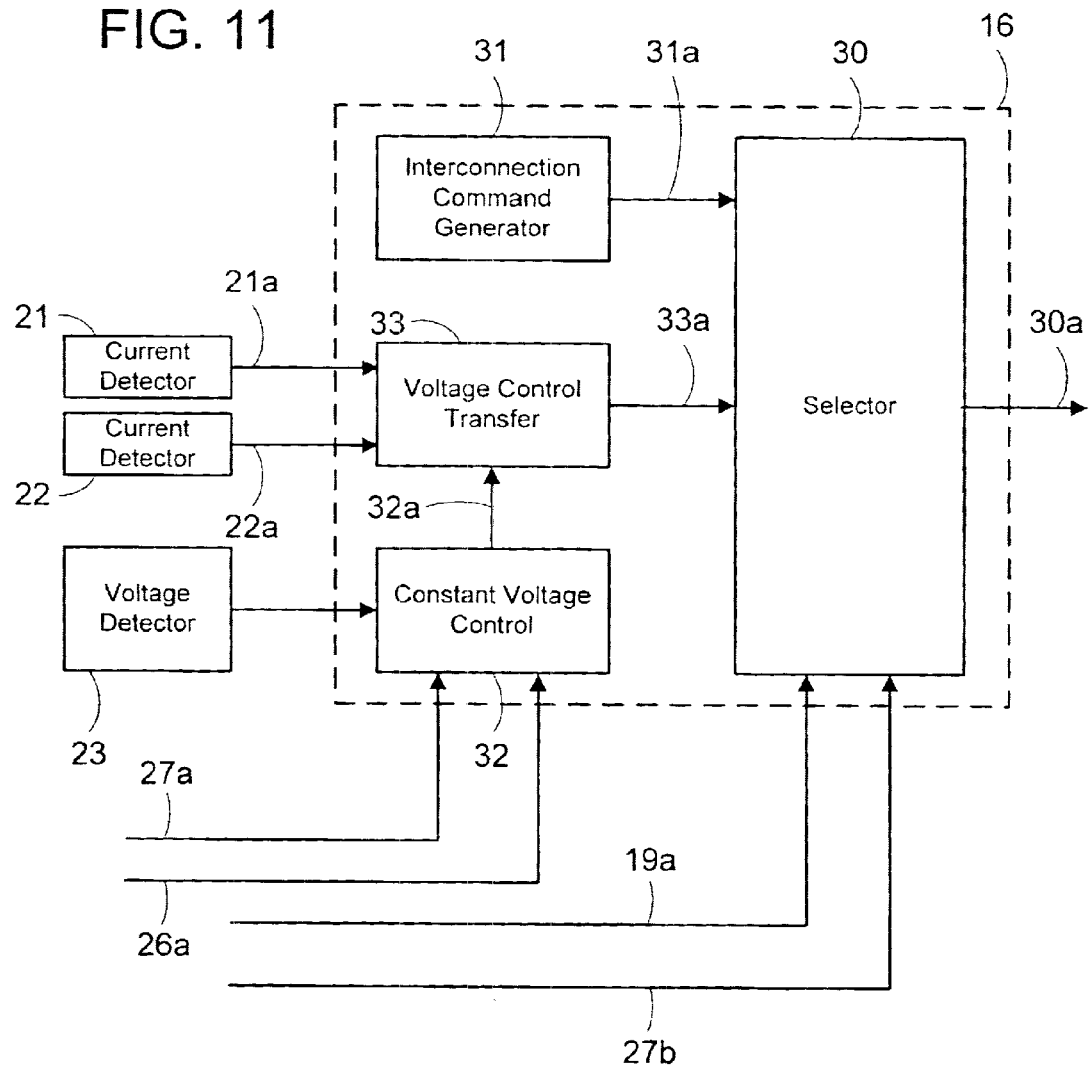
FIG. 11 is a detailed block diagram of a current command generator of the electric power system interconnection device of the fifth embodiment.
Figure 12:
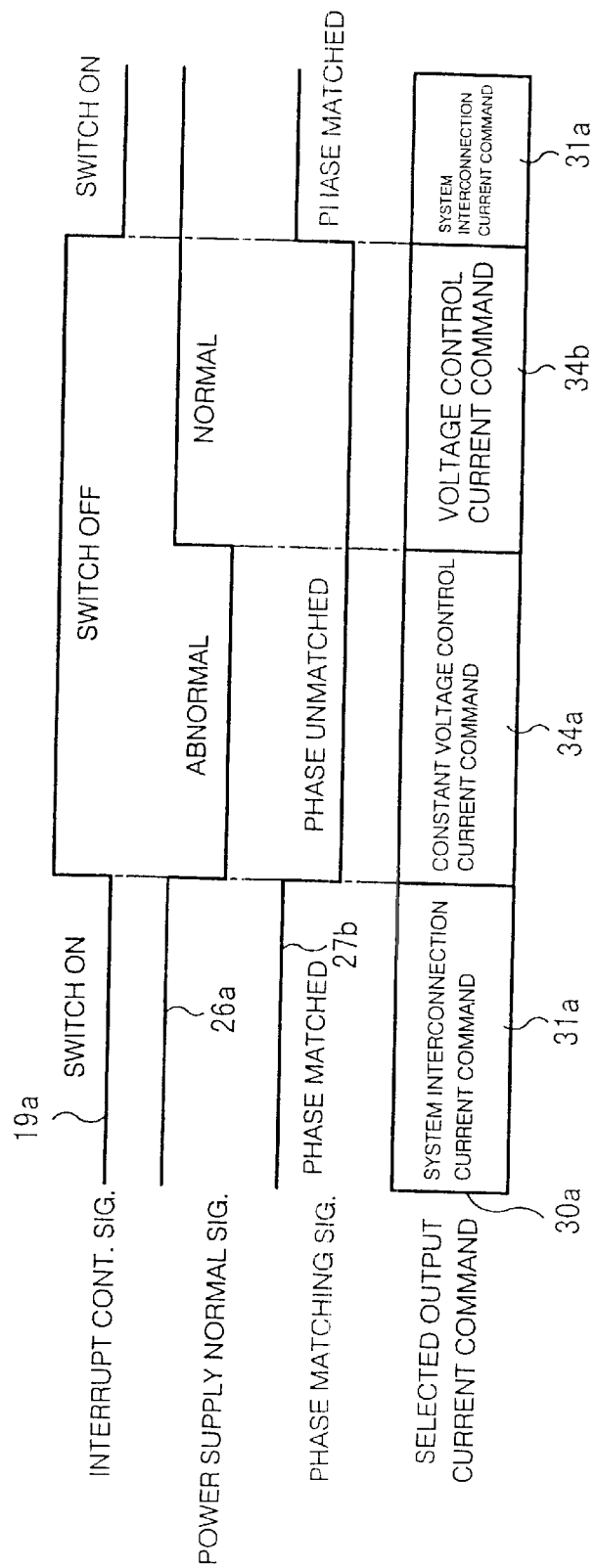
FIG. 12 is a time chart showing the operation of the electric power system interconnection device of the fifth embodiment.
Figure 13:
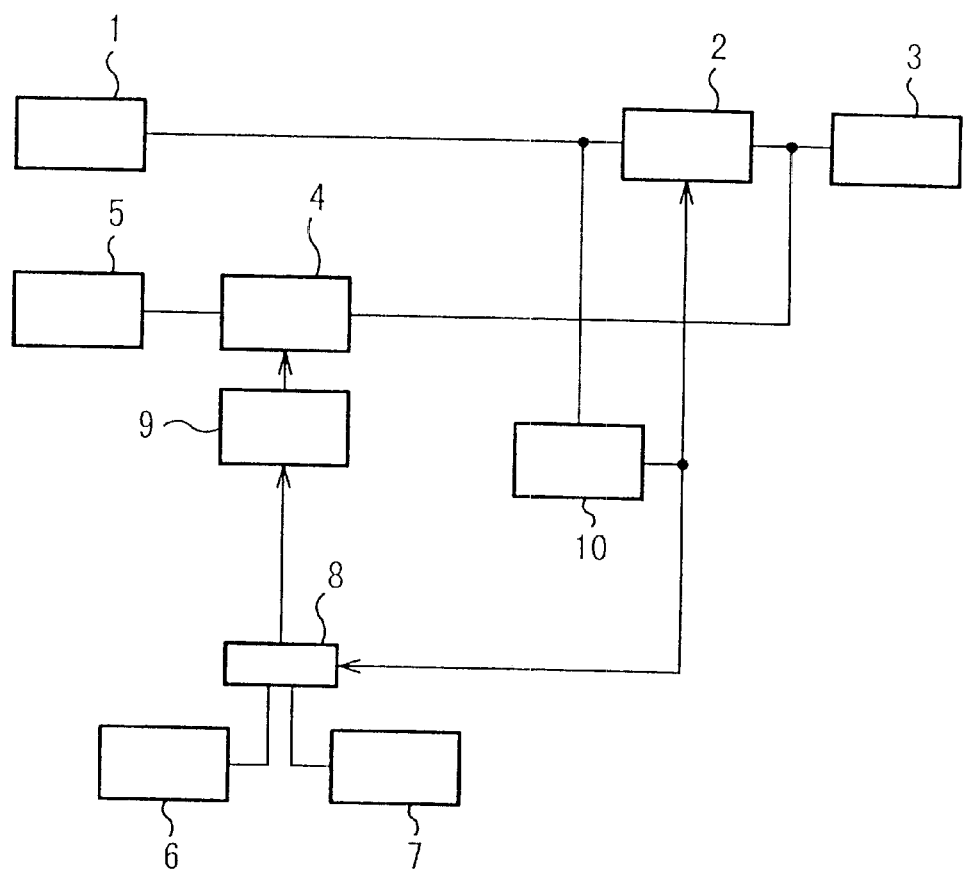
FIG. 13 is a block diagram of a conventional electric power system interconnection device.

FIG. 11 is a detailed block diagram of the current command generator 16 and FIG. 12 is a time chart showing the operation of a selector 30 of the current command generator 16 shown in FIG. 11.

While the primary power supply 11 is under normal operating conditions, the switch 12 is closed and draws a current from the primary power supply 11 and the selector 30 of the current command generator 16 selects a system interconnection current command 31a as an output current command 30a as shown in FIG. 12. In this case, a secondary power supply 15 is connected to the primary power supply 11 via the power converter 14 which is operated by electric power fed from the primary power supply 11.

When an abnormal condition occurs in the primary power supply 11, the interrupt control circuit 19 detects and latches an abnormal state based on a voltage detected by a voltage detector 23 and outputs the interrupt control signal 19a. In this case, the switch 12 opens upon receiving the interrupt control signal 19a, and the selector 30 of the current command generator 16 selects a constant voltage control current command 34a as the output current command 30a. The operation thus far described is the same as that of the fourth embodiment, wherein the switch current is instantly interrupted by controlling the output current of the power converter 14 by the constant voltage control current command 34a and, then, the power converter 14 is automatically set to output a specified constant voltage to the power converter 14.

If the primary power supply 11 restores its normal operating conditions when the switch 12 is open, the power supply state detection circuit 26 detects its recovery based on the voltage detected by the voltage detector 23 and outputs the power supply normal signal 26a to the current command generator 16. On the other hand, the phase synchronizing circuit 27 detects a phase difference between the voltage of the primary power supply 11 and the load voltage, calculates the phase control amount data 27a for synchronizing the phases of these voltages and outputs the phase control amount data 27a to the current command generator 16. Upon detecting a phase synchronization state in which the phase difference between these voltages is equal to or smaller than a specified value, the phase synchronizing circuit 27 outputs the phase matching signal 27b to the current command generator 16 and the interrupt control circuit 19. Once detecting an abnormal voltage of the primary power supply 11, the interrupt control circuit 19 continues to output the interrupt control signal 19a until the phase matching signal 27b is input even if the primary power supply 11 restores its normal operating conditions subsequently.

If the current command generator 16 receives the power supply normal signal 26a when the switch 12 is open and the constant voltage control current command 34a is selected by the selector 30, a constant voltage control circuit 32 calculates a corrected current command and outputs it to a constant voltage control command generator 34 such that the phase of the load voltage varies depending on the phase control amount data 27a input to the constant voltage control circuit 32. The constant voltage control command generator 34 generates and outputs a voltage control current command 34b which is corrected for achieving a state of phase synchronization by adding a switch current value 21a and a load current value 22a to the input current command in a manner similar to the fourth embodiment. The selector 30 continues to select the output of the constant voltage control command generator 34 as the output current command 30a which is now the voltage control current command 34b corrected for phase synchronization.

When the phase difference between the voltage of the primary power supply 11 and the load voltage becomes equal to or smaller than a specified value, the phase synchronizing circuit 27 outputs the phase matching signal 27b. Upon receiving the phase matching signal 27b, the interrupt control circuit 19 stops outputting the interrupt control signal 19a to thereby close the switch 12. At the same time, the selector 30 of the current command generator 16 selects the system interconnection current command 31a as the output current command 30a. As a consequence, the primary power supply 11 begins to supply again electric power to the load 13 and restores its normal operating conditions.

The electric power system interconnection device of this embodiment closes the switch 12 again after performing phase control operation to synchronize the phase of the output voltage of the power converter 14 with the phase of the voltage of the primary power supply 11 when the primary power supply 11 resumes its normal operating conditions. Therefore, it is possible to quickly reconnect the primary power supply 11 to the power converter 14 in a reliable fashion, thereby enabling the primary power supply 11 to supply electric power to the load 13 using normal electric power system interconnection.

While the aforementioned voltage phase control operation of the present embodiment has been described as being applied to the fourth embodiment, it may be applied to any of the foregoing embodiments. In any case, the voltage phase control operation of this embodiment enables the primary power supply 11 to quickly resupply electric power to the power converter 14 when the primary power supply 11 which has been under abnormal conditions restores its normal operating conditions.

What is claimed is:

1. An electric power system interconnection device for providing uninterrupted electric power to a load by establishing coordinated interconnection of a primary power supply and a secondary power supply, in which the primary power supply is connected to the load via a switch and the secondary power supply is connected to a load side of the switch via a power converter, said electric power system interconnection device comprising:

an interrupt control circuit which outputs an interrupt control signal for opening the switch upon detecting an abnormal voltage fed from the primary power supply;

a switch current interrupter for accelerating interruption of a current flowing through the switch by controlling an output current of the power converter with an output current command using the interrupt control signal as an input; and a constant voltage controller for maintaining a constant voltage applied to the load by controlling the power converter to output the constant voltage upon detecting the interruption of the current flowing through the switch.

2. The electric power system interconnection device as claimed in claim 1, wherein said switch current interrupter for accelerating interruption of the current flowing through the switch detects a load current flowing into the load and uses the load current detected as the output current command for the power converter.

3. The electric power system interconnection device as claimed in claim 2, wherein said switch current interrupter for accelerating interruption of the current flowing through the switch adds an AC current command to the output current command for the power converter when the primary power supply is a DC power supply, said switch current interrupter for accelerating interruption of the current flowing through the switch adding the AC current command to produce an AC current having a frequency higher than that of the current flowing through the switch to the output current command for the power converter when the primary power supply is an AC power supply.

4. The electric power system interconnection device as claimed in claim 1, wherein said switch current interrupter for accelerating interruption of the current flowing through the switch detects a load current flowing into the load and the current flowing through the switch, adds the load current and the current flowing through the switch, to produce a sum and uses the sum as the output current command for the power converter.

5. The electric power system interconnection device as claimed in claim 1 further comprising:

a phase difference detector for detecting a phase difference between phase of a voltage fed from the primary power supply and phase of a voltage applied to the load; and a phase synchronization controller for correcting the output current command for the power converter so that phase of the output voltage of the power converter synchronizes with the phase of the voltage fed from the primary power supply wherein, if the voltage fed from the primary power supply is normal when the switch is open, the output voltage of the power converter is controlled by the output current command corrected by the phase synchronization controller, and, when the phase difference detector detects that the phase difference has become no larger than a specified value, the switch is closed and the output current command for the power converter is switched to a current command for normal operating conditions of the primary power supply.

6. An electric power system interconnection device for providing uninterrupted electric power to a load by establishing coordinated interconnection of a primary power supply and a secondary power supply, in which the primary power supply is connected to the load via a switch and the secondary power supply is connected to a load side of the switch via a power converter, said electric power system interconnection device comprising:

an interrupt control circuit which outputs an interrupt control signal for opening the switch upon detecting an abnormal voltage fed from the primary power supply; and a constant voltage controller for maintaining a constant voltage to be applied to the load by controllably operating the power converter with an output current command calculated so that an output voltage of the power converter becomes the constant voltage, using the interrupt control signal as an input, and the power converter feeds a current flowing in a reverse direction to the switch to interrupt current flowing through the switch.

7. The electric power system interconnection device as claimed in claim 6, wherein the output current command used for controlling the power converter to output the constant voltage is obtained by detecting a load current flowing into the load and adding the load current to a current command calculated from deviation of the output voltage of the power converter from a voltage command for the power converter.

8. The electric power system interconnection device as claimed in claim 6, in the output current command used for controlling the power converter to output the constant voltage is obtained by detecting a load current flowing into the load and the current flowing through the switch and adding the load current and the current flowing through the switch to a current command calculated from deviation of the output voltage of the power converter from a voltage command for the power converter.

* * * * *